United States Patent [19]

Beaulat

[11] Patent Number: 5,595,415
[45] Date of Patent: Jan. 21, 1997

[54] TWIN-WALL COMPOSITE LINING FOR AUTOMOBILES

[75] Inventor: Bernard Beaulat, Brazay-en-Plaine, France

[73] Assignee: Plasto SA, France

[21] Appl. No.: 462,826

[22] Filed: Jun. 5, 1995

[30] Foreign Application Priority Data

Jun. 8, 1994 [FR] France .................. 94 06990

[51] Int. Cl.⁶ ........................................ B60J 5/04
[52] U.S. Cl. .................. 296/39.1; 296/146.5; 49/502
[58] Field of Search .................. 296/146.1, 146.5, 296/146.6, 152, 208, 39.1, 146.7; 49/502

[56] References Cited

U.S. PATENT DOCUMENTS

| | | | |
|---|---|---|---|
| 4,306,381 | 12/1981 | Presto | 296/146.5 X |
| 4,588,627 | 5/1986 | Isaksen et al. | 296/39.1 X |
| 4,783,115 | 11/1988 | Galubensky et al. | 296/208 |

FOREIGN PATENT DOCUMENTS

| | | | |
|---|---|---|---|
| 0495712A1 | 1/1992 | European Pat. Off. . | |
| 0551825A2 | 1/1993 | European Pat. Off. . | |
| 571640 | 12/1993 | European Pat. Off. | 296/39.1 |
| 7719966 | 6/1977 | France . | |
| 2409669 | 7/1979 | France | 296/39.1 |
| 8100760 | 1/1981 | France . | |
| 2569146 | 8/1985 | France . | |
| 2510220 | 9/1976 | Germany . | |
| 3600745 | 7/1986 | Germany | 296/39.1 |
| 4271918 | 9/1992 | Japan | 296/208 |

Primary Examiner—Joseph D. Pape
Attorney, Agent, or Firm—Ostrolenk, Faber, Gerb & Soffen, LLP

[57] ABSTRACT

A twin-wall composite lining for automobiles is mounted between the structure of the door and an interior covering including an internal panel providing a seal. It comprises over at least part of its surface a twin-wall delimiting at least one integral volume or cavity used to implement one or more additional functions, including the provision of ducting for air from an air conditioner or electrical cables. Applications include lining automobile doors.

13 Claims, 1 Drawing Sheet

TWIN-WALL COMPOSITE LINING FOR AUTOMOBILES

BACKGROUND OF THE INVENTION

1. Field of the Invention

The present invention concerns a composite lining for automobile doors formed by two walls with volumes between them having at least one function additional to the sealing function, such as ducting for the flow of air from an air conditioner, ducts for electric wires, soundproofing or heat insulation or a side impact protection (by absorbing energy).

2. Description of the Prior Art

The interior of automobile vehicle doors must be sealed to prevent rainwater and dust entering the passenger compartment and coming into contact with the interior lining of the vehicle. One prior art method of providing this seal fixes an impermeable film to the internal structures of the door, the film being disposed in such a way as to direct towards the exterior the water which inevitably infiltrates into the doors via the windows.

These impermeable films are usually in the form of a plastics material film coated with a layer of adhesive for ease of installation. Closed cell synthetic foam has also been used and has the advantage of providing heat insulation and soundproofing of the passenger compartment, in addition to providing a seal. Panels of this kind are also thermoformable and so can fit perfectly to the complex structures of the doors, to which they are fixed by means of a bead of adhesive.

The constant need to improve passenger comfort has led automobile manufacturers to improve air conditioning systems for the passenger compartment. To achieve satisfactory results, ducting must be provided to deliver air from the air conditioner into the passenger compartment near each passenger.

Although this is a relatively simple matter for the front seat passengers, it is often difficult to find room for air conditioning ducts in the rear part of the vehicle: the central console is taken up with electrical and mechanical equipment and so a path through the doors is often preferred, all the more so in that this provides a way of distributing hot air in winter to demist the side windows (see, for example, patent applications FR-A-2 473 962 and FR-A-2 361 232).

Document EP-A-0 551 825 concerns a thermoformed door seal lining disposed between the door structure and the interior covering. The seal lining described in this document has only one wall, however, and it is therefore not possible to provide specific volumes implementing functions additional to the sealing function.

Document EP-A-0 495 712 concerns an automobile door with an interior covering that also provides the sealing function. Because a good appearance is required, since it can be seen from the interior of the passenger compartment, the manufacturer of an interior covering of this kind combined with the sealing means is not only complex and difficult but also extremely costly; moreover, there is no lining proper providing the sealing and additional functions.

Documents DE 25 10 220, FR-A-2 569 146 and EP-A-0 495 712 respectively concern interior coverings, air ducts formed in the interior covering or other devices.

The present invention proposes a composite lining for automobiles which seals the door and provides at least one additional comfort or safety function, such as conducting air from the air conditioner to the side and rear parts of the vehicle, holding and protecting electrical wires, thermal insulation, soundproofing and/or side impact protection; this enhances the safety and the comfort of passengers.

SUMMARY OF THE INVENTION

The present invention consists in a multifunction composite lining for automobile doors adapted to be mounted between the structure of the door and an interior covering, said lining including an inner panel providing the sealing function and comprising over at least part of its surface a twin wall delimiting at least one integral volume or cavity which is used for one or more additional functions, for example to provide ducting for air conditioning air or electrical cables, said lining being separate from the interior covering and the two walls of the twin-wall structure being fastened together.

A composite lining in accordance with the invention can be made from the materials usually employed in this type of application, but closed cell polymer foam panels are preferable, for example polyethylene or polypropylene foam panels; these have the advantage of better stiffness, heat insulation and soundproofing properties than thin films, because of their relatively great thickness.

It is also possible to use composite structures formed of a polyethylene, polypropylene or polyurethane film combined with polyurethane foam, with the facility to integrate fibers or filaments to increase the strength of the panels.

It is important for the material to be thermoformable if shapes matched optimally to the structure of the door are to be obtained. In the general case in which the manufacture of a twin-wall composite lining in accordance with the invention entails assembling together two separate thermoformed parts, said parts can be made from different materials or from the same material with different thicknesses; the thickness can vary between 0.5 mm and 12 mm.

To manufacture a composite lining in accordance with the invention, a sheet of material is shaped to form a panel mating perfectly with the metal structure of the door and blocking any openings through which water can enter. The shaping is usually effected by thermoforming or by hydroforming, both methods being well known to the person skilled in the art.

The same process is then used to form a second part which, after it is fixed to the first panel, defines one or more volumes required to form the necessary ducts or cavities.

If an air duct is required, the inlet and outlet orifices of the duct can be obtained directly by assembling premolded shapes or cut out from the assembled lining; depending on the required result, the assembly can form a simple duct designed to fit inside the door covering or a more complex network for distributing air from the air conditioner both towards the back of the vehicle and towards the side windows.

Ducts for supporting and protecting electrical wires are made in the same way as air ducts, with the same facility for producing a more complex network for distributing various electrical wires. This enhances the reliability of the electrical conductors, which are both supported and protected from contact with the metal structure of the door.

To obtain soundproofing, heat insulation or side impact protection volumes, the walls are shaped to form closed cavities that are filled with materials appropriate to the required function. For heat insulation, for example, the cavity can be filled with synthetic material foam, glass wool or fleece; for soundproofing, the cavity contains synthetic material foam or thin bodies of greater density such as filled polymers; finally, to protect passengers against side impact, the cavities are filled with energy absorbing bodies such as honeycomb structures, hollow polypropylene balls or synthetic gels.

The two members constituting the lining of the invention can be welded or glued together.

The composite lining of the invention obtained in this way is fixed to the door structure by the usual means, for example a bead of hot melt glue or pressure-sensitive adhesive applied to the edge of the lining, clips or staples. The preferred means is a bead of glue protected by a protector which is removed at installation time.

When the lining incorporates an air conditioning duct, the ends of the duct supported by the sealing panel are nested over the corresponding parts of the door structure or the covering panel. This is easier if a polyolefin foam is used, since this material can be thermoformed and retains the flexibility and elasticity needed to make this coupling.

For example, the air inlet into the front door duct could be achieved by nesting the end of said duct over a sleeve carried by the door covering, the latter being pressed onto the air outlet at the side of the dashboard when the door is closed, with a flexible gasket between them.

The duct outlets are connected either to sleeves directing the air towards the fixed vertical upright between the front and rear doors and then towards the rear parts of the vehicle or towards diffusers providing ventilation through the door coverings.

Other advantages and features of the invention will emerge from a reading of the following description of two preferred embodiments of the invention and from the appended drawings.

DETAILED DESCRIPTION OF THE PREFERRED EMBODIMENTS

Figure 1:
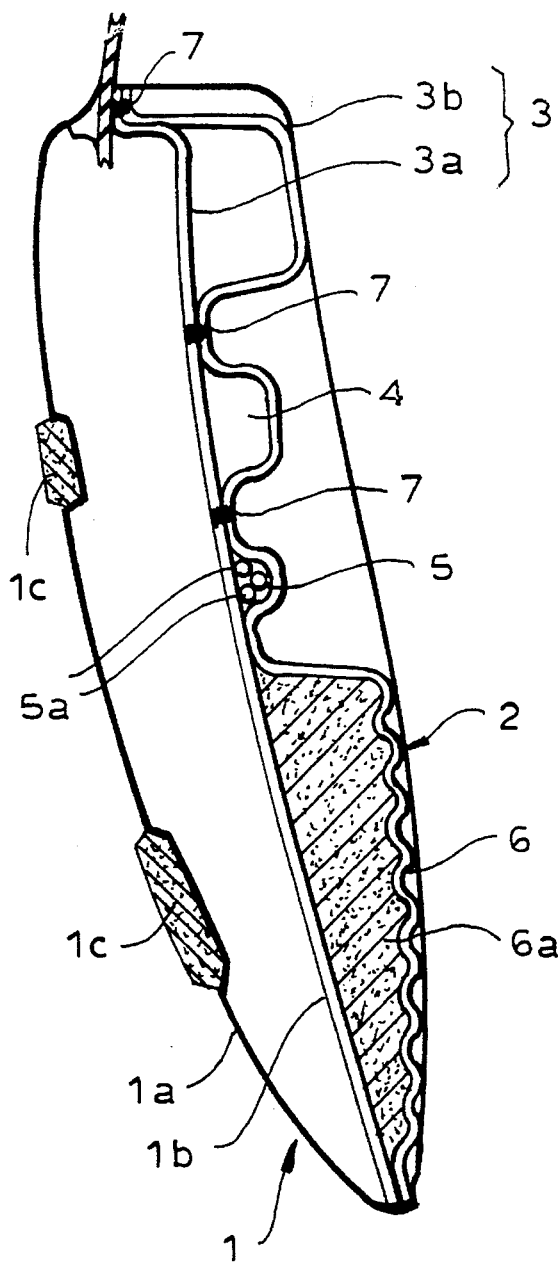
FIG. 1 is a diagrammatic sectional view of an automobile door provided with a first embodiment of the composite lining of the invention and an internal covering.

Referring to FIG. 1, the metal (for example) structure of an automobile door 1 comprises an outer skin 1a provided with rubbing strips 1c and an inner skin 1b to which the composite lining of the present invention is fixed, an interior covering panel 2 of the door being fixed over said composite lining.

The composite lining 3 comprises a first panel 3a providing the sealing function which is fixed by any appropriate means, e.g., a bead of pressure-sensitive glue to the inner skin 1b and which is made from thermoformed polyethylene foam, for example, and a second panel 3b in the form of a thermoformed polyethylene foam shell, for example. The second panel 3b has functions additional to the sealing function and at least one volume or cavity is formed in it. It preferably includes a plurality of volumes including a volume 4 constituting a ventilation duct and another volume 5 for supporting and providing a passage for electrical cables 5a. Another volume or cavity 6 is also provided and can be filled with an energy absorbing material 6a. The two panels 3a and 3b are welded together by welds 7, for example or they may be glued together at 7.

Figure 2:
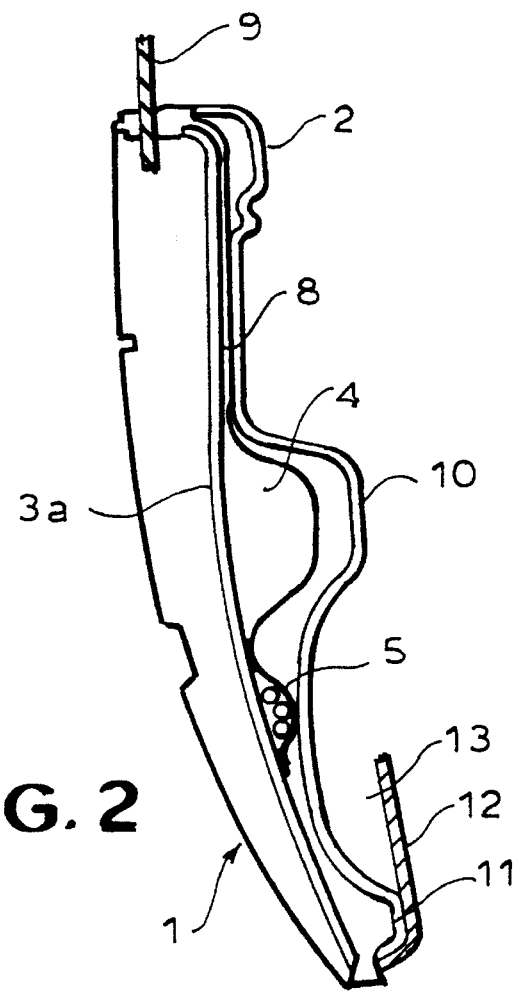
FIG. 2 is a diagrammatic sectional view of a second embodiment of composite lining of the invention.

In the second embodiment of the invention shown in FIG. 2, the panel 3b which has functions additional to the sealing function comprises at least the two volumes or cavities 4 and 5 but does not cover all of the sealing panel 3a, stopping just below the cavity 5, for example. The cavity 4 forms part of or is connected to an air distribution network (not shown) to ventilate the rear of the vehicle and to feed warm air via vertical conduits 8 to a point near the side window for demisting the window. The interior covering panel 2 of the door 1 can be thermoformed and incorporate an elbow support 10 thermoformed at the location of the cavity 4, for example, and a bottom lip 11 to which a member 12 can be fixed by any appropriate means to constitute a door pocket 13.

The twin-wall composite linings incorporating volumes adapted to form ventilation ducts, electrical wiring ducts or cavities to receive soundproofing, heat insulation or energy absorbing materials find an application in the construction of automobile vehicles. The provision of a lining which in this way combines the door sealing function with at least one other comfort or safety function considerably simplifies the assembly of the vehicle and makes optimum use of the interior volume of the door, even when the latter includes complex shapes.

There is claimed:

1. A composite lining and automobile door, wherein the door comprises an outer door panel facing outward, an interior covering panel of the door facing inward and, at least over part of the respective opposed surface areas of the outer door panel and the interior covering panel, the interior covering panel being spaced away from the outer panel;

a composite lining disposed between the outer door panel and the interior covering panel; the composite lining comprising a first outer panel of a material adapted to perform a sealing function, and the first panel being fixed to the surface of the outer door panel;

the composite lining further comprising a second inner panel to which the interior covering panel is fixed, the second panel being shaped and profiled relative to the first panel for defining a cavity between them and for the first and second panels contacting each other away from the cavity; and means for fastening the first and second panels of the lining together.

2. Lining according to claim 1 wherein the inner panel is shaped to define a plurality of the cavities of integral volumes, one of the cavities is used to distribute air conditioning air and another of the cavities is used to accommodate and support electrical cables.

3. Lining according to claim 1 further comprising the cavity being filled with energy absorbing material adapted to constitute side impact protection for said door.

4. Lining according to claim 1 including the cavity being adapted to be filled at least partly with a heat insulation or soundproofing material.

5. Lining according to claim 1 wherein the inner and outer panels are made from two thermoformable polymer sheets.

6. Lining according to claim 5 wherein said two thermoformed sheets are welded or glued together.

7. Automobile door lining according to claim 1 fixed to the interior of an automobile door by means of a bead of pressure-sensitive glue.

8. Lining according to claim 1 wherein said interior covering comprises an elbow support formed at the location of one cavity.

9. Lining according to claim 1 wherein said panel with integral volumes covers part of the sealing panel.

10. A lining according to claim 1, the cavity comprising a volume for distributing air conditioning air.

11. A lining according to claim 1, the cavity comprising a volume for electrical cables.

12. A lining according to claim 8 having a plurality of the cavities of which one is for distributing air conditioning air and the elbow support is formed at the location of the cavity distributing air conditioning air.

13. The lining of door of claim 1, wherein the outer door panel comprises an outer skin facing outward of the door and an inner skin facing inward toward the lining, the first outer panel of the lining being secured to the inner skin of the door panel.

* * * * *